UNITED STATES PATENT OFFICE.

JOHN Y. TRAMMELL, OF NOTASULGA, ALABAMA.

MILLSTONE.

SPECIFICATION forming part of Letters Patent No. 238,461, dated March 1, 1881.

Application filed December 21, 1880. (No model.)

*To all whom it may concern:*

Be it known that I, JOHN Y. TRAMMELL, of Notasulga, in the county of Macon, and in the State of Alabama, have invented certain new and useful Improvements in Manufacture of Millstones; and I do hereby declare that the following is a full, clear, and exact description thereof, reference being had to the accompanying drawings, and to the letters of reference marked thereon, making a part of this specification.

This invention has for its objects to produce a millstone that will combine the sharp cutting properties of the French burr-wheels with the smooth flattening properties of the Esopus burrs, and thus with a single pair of stones effect the grinding of the flour quickly and to the proper degree of fineness. These objects I attain by the devices illustrated in the accompanying drawings, in which—

Figure 1 represents a vertical sectional view, showing two millstones constructed according to my invention, and Fig. 2 a face view of one of the stones.

In carrying out my invention I construct each stone in two parts, the part A around the eye being formed of French burr, which possesses sharp cutting qualities, but which is not adapted to grind the flour to the proper degree of fineness, the part B at the periphery being formed of the burr known in the art as "Esopus."

As thus constructed it will be perceived that the portions of the stones around the eye accomplish the cutting, while the portions at the periphery serve to grind the grain thus cut to the proper degree of fineness.

Having thus described my invention, what I claim as my invention, and desire to secure by Letters Patent, is—

A burr constructed of two different varieties of stone, one forming the central portion around the eye and being of French burr, possessing sharp cutting qualities, and the other forming the peripheral portion, and being constructed of Esopus burr, possessing fine-grinding qualities, substantially as specified.

In testimony that I claim the foregoing I have hereunto set my hand this 7th day of December, 1880.

JOHN Y. TRAMMELL.

Witnesses:
W. B. CALLAHAN,
W. C. ROBINSON.

UNITED STATES PATENT OFFICE.

JOHN Y. TRAMMELL, OF NOTASULGA, ALABAMA.

MILLSTONE.

SPECIFICATION forming part of Letters Patent No. 238,461, dated March 1, 1881.

Application filed December 21, 1880. (No model.)

*To all whom it may concern:*

Be it known that I, JOHN Y. TRAMMELL, of Notasulga, in the county of Macon, and in the State of Alabama, have invented certain new and useful Improvements in Manufacture of Millstones; and I do hereby declare that the following is a full, clear, and exact description thereof, reference being had to the accompanying drawings, and to the letters of reference marked thereon, making a part of this specification.

This invention has for its objects to produce a millstone that will combine the sharp cutting properties of the French burr-wheels with the smooth flattening properties of the Esopus burrs, and thus with a single pair of stones effect the grinding of the flour quickly and to the proper degree of fineness. These objects I attain by the devices illustrated in the accompanying drawings, in which—

Figure 1 represents a vertical sectional view, showing two millstones constructed according to my invention, and Fig. 2 a face view of one of the stones.

In carrying out my invention I construct each stone in two parts, the part A around the eye being formed of French burr, which possesses sharp cutting qualities, but which is not adapted to grind the flour to the proper degree of fineness, the part B at the periphery being formed of the burr known in the art as "Esopus."

As thus constructed it will be perceived that the portions of the stones around the eye accomplish the cutting, while the portions at the periphery serve to grind the grain thus cut to the proper degree of fineness.

Having thus described my invention, what I claim as my invention, and desire to secure by Letters Patent, is—

A burr constructed of two different varieties of stone, one forming the central portion around the eye and being of French burr, possessing sharp cutting qualities, and the other forming the peripheral portion, and being constructed of Esopus burr, possessing fine-grinding qualities, substantially as specified.

In testimony that I claim the foregoing I have hereunto set my hand this 7th day of December, 1880.

JOHN Y. TRAMMELL.

Witnesses:
W. B. CALLAHAN,
W. C. ROBINSON.